Aug. 20, 1940.  J. H. ARTHUR  2,212,361
METHOD OF MAKING A RESILIENT STUD ENGAGING MEMBER
Filed July 14, 1938
Fig. 1.
Fig. 2.
Fig. 3.
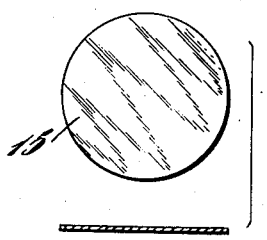
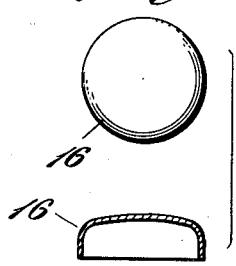
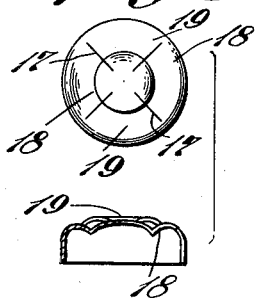
Fig. 4.
Fig. 5.
Fig. 6.
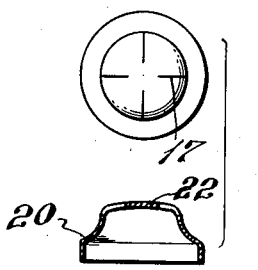
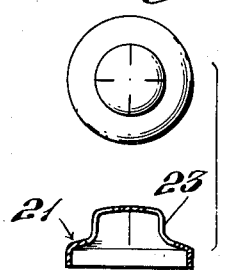
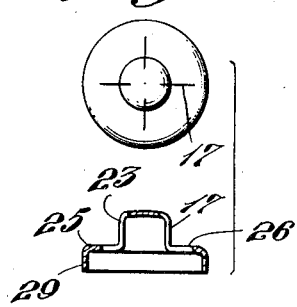
Fig. 7.
Fig. 8.
Fig. 9.
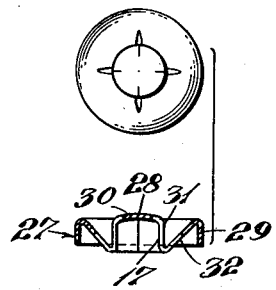
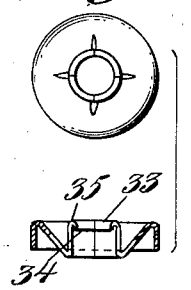
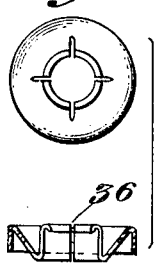
Fig. 10.
Fig. 11.
Fig. 12.
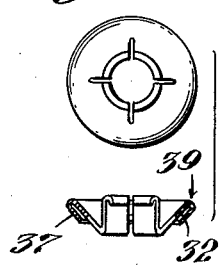
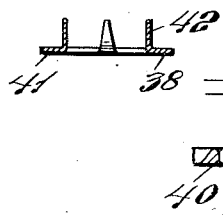
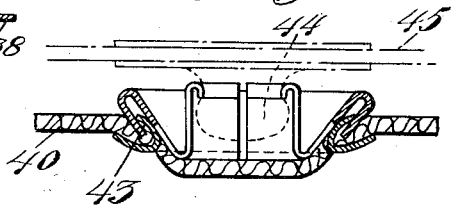
INVENTOR.
James H. Arthur
BY Barlow & Barlow
ATTORNEYS.

UNITED STATES PATENT OFFICE 2,212,361

METHOD OF MAKING A RESILIENT STUD ENGAGING MEMBER

James H. Arthur, Providence, R. I., assignor to Rau Fastener Company, a corporation of Rhode Island Application July 14, 1938, Serial No. 219,152

6 Claims. (Cl. 113—116)

This invention relates to improvements in snap fasteners and particularly to an improvement in the method of making a stud engaging member of such snap fastener; and has for one of its objects to provide a series of operations whereby an improved snap fastener may be provided in a more simple manner than heretofore.

Another object of the invention is to provide slits in the stud engaging edges of the member in a more simple and less expensive manner and the provision of these slits without the removal of any stock from the member.

Another object of the invention is to provide a fastener which will have a smoother engaging edge and yet one which exerts as great a gripping pressure as is desired upon the stud with which it engages.

Another object of the invention is to provide a stud engaging member which may be made in an eyelet machine in a series of operations and without handling the blank from the beginning to the end of the machine operations.

With these and other objects in view, the invention consists of certain novel features of construction, as will be more fully described, and particularly pointed out in the appended claims.

In the accompanying drawing:

Figs. 1 to 10, inclusive, are diagrammatic views in plan and cross-section illustrative of the various and successive steps involved in the carrying out of one method of forming the stud engaging member in accordance with the present invention:

Fig. 11 is a sectional view of the part for attaching the stud engaging member to a piece of fabric or the like;

Fig. 12 is a sectional view showing the stud engaging member as attached to a piece of fabric and showing the stud in dotted lines as engaged.

In the formation of a resilient socket or stud engaging member for a snap fastener where the portion which engages the stud is slit to provide for resilience the slit or slits are usually formed in the member after the same has been drawn to substantially finished form. To slit the member when in this finished form is an expensive operation both from the standpoint of tool costs and of performance and usually such slitting at this time causes the removal of stock from the fastener; and in order to reduce such costs and also to avoid the removal of stock from the attaching member, I have arranged to slit the member before it is deflected from the blank into finished form and before the center portion for receiving the stud is removed so that when the center is removed the slit will extend from the opening formed by the removal of the stock into a wall to a sufficient extent to provide the resilience desired, and by this arrangement I am enabled to accomplish improved results in my stud engaging member; and the following is a more detailed description of the present embodiment of this invention, illustrating the preferred means by which these advantageous results may be accomplished:

With reference to the drawing, wherein for the purpose of illustration there is shown one specific method of carrying out the present invention, the blank for the stud engaging member is cut out in circular formation as at 15 in Fig. 1 from some suitable piece of sheet stock and is of a size and thickness sufficient when deflected as shown in the subsequent figures to provide the stud engaging member of the size required. The steps are performed in what is known as an eyelet machine wherein there will be a plurality of different plungers each equipped with a tool of a different shape so that when the male and female portions of the plungers are brought together the shape of the stock will be transformed in steps finally arriving at the desired shape to be had.

In the first step the disk 15 is drawn into a cup formation 16, as shown in Fig. 2, and is then slit in the next step as at 17 by forcing certain portions 18 of the stock inwardly while allowing other portions 19 of the stock to remain in substantially the formulated position which they assume in Fig. 2, or forcing them in the opposite direction. This causes a shearing of the stock along the lines 17 to form a severing or slit in the stock without removing any of the stock, and in the next operation shown in Fig. 4 the cup is transformed into the shape 20 in which the slits 17 are closed so that the stock presents a uniform shape circularly thereof.

In the next step shown in Fig. 5 the cup 21 is further drawn to extend the depth slightly of the cup and to cause the same to be of a shorter dimension across the cup and thereby causing the slits to extend along the full length of the side walls 23 rather than merely remaining in the end wall as 22 of the cup 20, as shown in Fig. 4.

In the next subsequent operation the cup 25 is further deflected which draws the slits 17 not only in the upstanding side walls 23 but by reducing the diameter of this portion of the cup the slits 17 extend into the wall portion 26 of the stud engaging member as may be seen in Fig. 6.

In the next operation the member shaped as at 27 is formed by pressing inwardly the central portion 28 which was standing up above the flange 29, as shown in Fig. 6, so that it is now within the flange 29, as may be seen in Fig. 7. This disposes the slits 17 extending from the top wall 30 of the cup-shaped portion through the side walls 31 and into the inclined deflecting walls 32 while the same terminates short of the annular rim or wall 29 formed on the member.

In the next operation, shown in Fig. 8, the center 33 is cut out of the wall 30 and the wall is turned inwardly as at 34 forming a rounded edge 35. In Fig. 9 the stock is not a great deal further deflected, but is caused to assume an accurate size and in many instances the slits are spread apart slightly as at 36 so that the diameter of the opening will be to certain specifications. In Fig. 10 the finishing step occurs where the flanges 29 are bent inwardly to the form shown at 37 which provides for the reception of the securing member 38 which may hold the device 39 shown in Fig. 10 to a piece of fabric 40. The annular ring 41 of the member 38 engages the fabric 40 on one side while prongs 42 pass through the fabric 40 engaging the inclined deflecting wall 32 and are turned outwardly as at 43 shown in Fig. 12 and securely holds the device in position in a piece of fabric for the reception of a stud 44 on another piece of fabric 45 for releasable engagement therewith. The stud 44 is curved and by reason of the rolled edge 35 has a very smooth entrance and exit from the resilient walls of the socket formed by the slits 17.

The slits are shown as four in number but may be one or any number, preferably arranged, if more than one, equally distant about the arc of the circle to cause the desired resiliency to occur in the socket member in the fastener.

By slitting as at 17 prior to the cutting out of the end wall 30 no stock need be removed and a stronger and yet more easy working stud engaging member is provided. While I have illustrated the slits as provided in the step 3 in a very simple operation by shearing, it is conceivable that these slits might be formed at some other step prior to Fig. 8 in which the opening is cut out to form the entrance opening for the stud. In fact, it is conceivable that these might be performed in the blank as shown in Fig. 1 prior to any drawing of the stock.

The foregoing description is directed towards the method and construction illustrated, but I desire it to be understood that I reserve the privilege of resorting to all the equivalent changes to which the construction and method are susceptible, the invention being defined and limited only by the terms of the appended claims.

I claim:

1. The method of making a resilient stud engaging member of the class described which comprises providing a single piece of sheet metal shaped to provide a blank having sufficient material for the formation therefrom of a stud engaging annulus, drawing the blank to deflect the stock from the plane of the blank to provide an enclosed wall and forming a central opening and prior to formation of said opening slitting the stock which forms said wall so as to extend to the edge of said opening when the central opening is formed.

2. The method of making a resilient stud engaging member of the class described which comprises providing a single piece of sheet metal shaped to provide a blank, drawing the blank to deflect the stock from the plane of the blank into cup shape with an enclosing wall, and forming a central opening in the cup and prior to formation of said opening slitting the stock which forms said wall so as to extend to the edge of said opening when the central opening is formed.

3. The method of making a resilient stud engaging member of the class described which comprises providing a single piece of sheet metal shaped to provide a blank, drawing the blank to deflect the stock from the plane of the blank into cup shape, shearing the stock of the cup, further drawing the cup to provide an enclosing wall containing said shear, and forming a central opening in the cup to the edges of which said shear extends.

4. The method of making a resilient stud engaging member of the class described which comprises providing a single piece of sheet metal shaped to provide a blank, drawing the blank to deflect the stock from the plane of the blank into cup shape, shearing the stock of the cup by movement of stock in opposite directions, further drawing the cup to provide an enclosing wall containing said shear, and forming a central opening in the cup to the edges of which said shear extends.

5. The method of making a resilient stud engaging member of the class described which comprises providing a single piece of sheet metal shaped to provide a blank, drawing the blank to deflect the stock from the plane of the blank into cup shape, shearing the stock of the cup, further drawing the cup to provide an enclosing wall containing said shear and forming a central opening in the cup to the edges of which said shear extends, and rolling in the stock about the central opening.

6. The method of making a resilient stud engaging member of the class described which comprises providing a single piece of sheet metal shaped to provide a blank, drawing the blank to deflect the stock from the plane of the blank into cup shape, shearing the stock of the cup by movement of stock in opposite directions, further drawing the cup to provide an enclosing wall containing said shear and forming a central opening in the cup to the edges of which said shear extends, and rolling in the stock about the central opening.

JAMES H. ARTHUR.